US008635321B2

United States Patent
Schieder et al.

(10) Patent No.: US 8,635,321 B2
(45) Date of Patent: Jan. 21, 2014

(54) TECHNIQUES FOR FEED-BASED AUTOMATIC TRANSMISSION OF CONTENT TO A MOBILE TERMINAL

(75) Inventors: Andreas Schieder, Würselen (DE); Rodolfo Cartas, Aachen (DE); Heiko Perkuhn, Aachen (DE); Markus Kampmann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 377 days.

(21) Appl. No.: 12/922,334

(22) PCT Filed: Mar. 14, 2008

(86) PCT No.: PCT/EP2008/053070
§ 371 (c)(1),
(2), (4) Date: Nov. 29, 2010

(87) PCT Pub. No.: WO2009/112079
PCT Pub. Date: Sep. 17, 2009

(65) Prior Publication Data
US 2011/0066715 A1 Mar. 17, 2011

(51) Int. Cl.
*G06F 15/16* (2006.01)
(52) U.S. Cl.
USPC ............................ 709/223; 709/203; 709/217
(58) Field of Classification Search
USPC .......... 709/200–203, 217–227, 228, 229, 230
See application file for complete search history.

(56) References Cited

U.S. PATENT DOCUMENTS

| 8,230,037 B2 * | 7/2012 | Story et al. ................... 709/217 |
| 8,327,297 B2 * | 12/2012 | Van Valen, III .............. 715/864 |
| 2005/0039136 A1 | 2/2005 | Othmer |
| 2006/0002317 A1 * | 1/2006 | Punaganti Venkata ....... 370/310 |
| 2007/0225047 A1 * | 9/2007 | Bakos .......................... 455/566 |
| 2007/0240030 A1 * | 10/2007 | Cronstrom ................. 715/500.1 |
| 2007/0260637 A1 | 11/2007 | Shenfield et al. |
| 2008/0155112 A1 * | 6/2008 | Ma et al. ...................... 709/231 |

(Continued)

FOREIGN PATENT DOCUMENTS

| EP | 1777632 A2 | 4/2007 |
| JP | H11338796 A | 12/1999 |
| JP | 2008040788 A | 2/2008 |
| WO | 2005117345 A1 | 12/2005 |
| WO | 2007/068268 A1 | 6/2007 |

OTHER PUBLICATIONS

De Sutter, R. et al. "Enhancing RSS Feeds: Eliminating Overhead through Binary Encoding." Third International Conference on Information Technology and Applications, 2005 (ICITA 2005), Sydney, Australia, Jul. 4-7, 2005, pp. 520-525.

*Primary Examiner* — Moustafa M Meky
(74) *Attorney, Agent, or Firm* — Coats and Bennett PLLC

(57) ABSTRACT

For improving feed-based automatic distribution of content to a mobile terminal via a mobile network, a network component (150) comprises a network-side agent (160). The network-side agent (160) manages the feed-based automatic transmission of content to the mobile terminal and is configured to periodically generate a feed request to a feed server, to receive a requested feed from the feed server in response to the feed request, and to transmit the received feed to the mobile terminal. The network component (150) may also comprise a cache memory (164) for storing copies of feeds and contents and a proxy for processing feed requests and content requests received from the mobile terminal (110).

21 Claims, 10 Drawing Sheets

(56) References Cited

U.S. PATENT DOCUMENTS

| | | | |
|---|---|---|---|
| 2008/0276164 A1* | 11/2008 | Bamford | 715/238 |
| 2009/0061925 A1* | 3/2009 | Finkelstein et al. | 455/552.1 |
| 2010/0070565 A1* | 3/2010 | Leblanc et al. | 709/203 |
| 2010/0198686 A1* | 8/2010 | Guedalia et al. | 705/14.53 |
| 2010/0274922 A1* | 10/2010 | Reavely | 709/238 |

* cited by examiner

TECHNIQUES FOR FEED-BASED AUTOMATIC TRANSMISSION OF CONTENT TO A MOBILE TERMINAL

FIELD OF THE INVENTION

The present invention relates to feed-based automatic transmission of content to a mobile terminal which is coupled to a mobile network, corresponding communication methods, network components, and mobile terminals.

BACKGROUND OF THE INVENTION

Automatic distribution of content to mobile terminals, which may also be referred to as "podcasting", is becoming increasingly important. In this respect, a "feed" is referred to as a document, typically an XML-document (XML: Extensible Markup Language) that contains references to network resources providing the contents to be distributed. These references within a feed are frequently updated. Typically, a feed contains a URI (URI: Uniform Resource Identifier) for each content. Typical formats of feeds are RSS1, RSS2, and ATOM. Details on these formats can be found in the RSS specification and in the atom syndication format specification RFC4287.

The general principle of feed-based automatic distribution of content is as follows: If a content provider wants to publish data, e.g. multimedia content such as audio data or video data, the content is made available through a URI. Typically, this URI is an HTTP address (HTTP: Hypertext Transfer Protocol), but can also link to any other kind of transport mechanism, e.g. BitTorrent. The URI of the newly published content is then added to the feed as an item. An item can contain information related to the content, such as title, summary or other information. In the RSS format, the URI of the content is appended to the item as an enclosure tag.

In order for a user to receive the automatically distributed content, a user's terminal is provided with a client for receiving the automatically distributed content on the basis of the feed. For example, such clients are referred to as "RSS readers", "RSS clients" or aggregators. The client periodically retrieves the feed from a network resource which is referred to as a feed server. Typically, the feed is identified by an URI. If the user subscribes to a feed, the URI of the feed is added to the client. The client then periodically retrieves the feed from the feed server and, if the feed contains new items, proceeds to download the linked content. After downloading, the client informs the user that new content has been received.

The above concept of feed-based automatic distribution of content can also be applied to mobile terminals which communicate with the feed server and the content server via a mobile network, such as a GSM mobile network (GSM: Global System for Mobile Communications), a UMTS mobile network (UMTS: Universal Mobile Telecommunications Systems) or the like. However, in this case there exist problems in that the clients on the mobile terminals frequently retrieve the feeds and, for this purpose, establish connections to the feed and content service. For a large number of mobile terminals this results in increased bandwidth consumption.

Firstly, the feeds itself can become considerably large. There is no limit on the amount of items a feed can contain. If the feed provider doesn't prevent, a feed can grow endlessly. In this respect, it is known to restrict feeds so as to contain only a reduced number of recently published items, to contain a brief summary, or both. This in turn reduces the ability of referencing old content.

Secondly, bandwidth usage patterns in the mobile network change due to the feed-based automatic distribution of content. In particular, the clients use bandwidth in a different manner than a human user. A human user typically regularly checks for new content published by a favourite provider. This can be from a few times a month or week to several times a day. In feed-based automatic distribution of content, feeds and content are retrieved much more periodically (once or twice an hour) and from all content providers the user is subscribed to.

Thirdly, the mobile terminals each individually retrieve the feeds and contents from the respective servers, which means that the feeds and contents have to be transmitted in a point-to-point fashion which requires a large bandwidth.

Accordingly, there exists a need to provide improved techniques for feed-based automatic distribution of contents to mobile terminals coupled to a mobile network.

SUMMARY OF THE INVENTION

According to an embodiment of the invention, a network component for use in a mobile network is provided. The network component comprises a network-side agent for managing feed-based automatic transmission of content to a mobile terminal. The network-side agent is configured to periodically generate a feed request to a feed server, to receive a requested feed from the feed server in response to the feed request, and to transmit the received feed to the mobile terminal.

The network component may be any component within the infrastructure of the mobile network which is suitable to establish connection to mobile terminals coupled to the mobile network and to other network resources. For example, the network component may be an application server. As the network component is part of the network infrastructure, it may also be referred to as a network-side component.

In the network component according to the embodiment, feed requests are periodically generated within the mobile network and the received feeds are transmitted to the mobile terminal. Accordingly, control of the process of requesting feeds and transmitting feeds to the mobile terminal is within the mobile network and can thus be adapted in view of bandwidth requirements. For example, the received feeds may be transmitted to the mobile terminals only under certain conditions, e.g. at times of low bandwidth usage. Further, it is no longer necessary that feed requests are transmitted from a mobile terminal in a periodic manner so as to check for updates. Rather, the update process can be accomplished by the network component which reduces the number of feed requests transmitted from the mobile terminal to the mobile network.

According to an embodiment, the network-side agent is configured to transmit the received feed to the mobile terminal only if the received feed contains new information. In this way, bandwidth consumption is reduced by avoiding transmission of redundant information which is already available in the mobile terminal.

The network-side agent may further be configured to generate subscription information on the basis of a feed request received from the mobile terminal. The subscription information indicates that a client of the mobile terminal is subscribed to the requested feed. The network-side agent may then generate the feed request on the basis of this subscription information. In this way, a feed request needs to be transmitted only once from the mobile terminal, e.g. in case of a new subscription to the feed. As a feed request has been received from the mobile terminal, the network-side agent concludes that the client of the mobile terminal is now subscribed to the corresponding feed. Accordingly, the received feed requests are suitable to locally generate and maintain subscription data. A dedicated transmission of subscription information from the mobile terminal to the mobile network is not necessary in this case.

Preferably, the network component further comprises a feed cache for storing a copy of the received feed. In this way, the number of feed requests transmitted from the network component to the feed server may be reduced, thereby reducing bandwidth consumption within the mobile network. For example, if a feed which was requested by one mobile terminal is also requested by another mobile terminal, it is not necessary to newly request the feed from the feed server. Rather, the copy of the feed in the cache may be transmitted to the requesting mobile terminal. In addition, the cached copies of feeds may be used when evaluating newly received feeds with respect to updated information.

In addition to the feed cache, the network component may also comprise a feed proxy for receiving a feed request from the mobile terminal and for transmitting a requested feed to the mobile terminal in response to the feed request. In particular, the feed proxy may be configured to perform the following operations: If a copy of the requested feed is not available in the feed cache, the feed proxy forwards the feed request to the feed server, receives the requested feed from the feed server, stores the received feed in the feed cache, and transmits the requested feed to the mobile terminal on the basis of the received feed. If a copy of the requested feed is available in the feed cache, the feed proxy transmits the requested feed to the mobile terminal on the basis of the copy in the feed cache. In this way, feed requests are forwarded by the network component only if the requested feed is not locally available in the network component, which further reduces bandwidth consumption on a communication link between the network component and the feed server.

According to an embodiment, the network-side agent is further configured to generate a content request to a content server on the basis of the received feed, to receive a requested content from the content server in response to the content request, and to transmit the received content to the mobile terminal. In this way, not only the bandwidth consumption due to the transmission of feeds is reduced, but also the bandwidth consumption due to the transmission of content. In particular, it is possible that the network component controls the transmission of content to the mobile terminal in view of reduced bandwidth consumption. For example, the type of communication link to the mobile terminal and the time of transmission may be selected so as to obtain an improved bandwidth usage.

The network component may also comprise a content cache for storing the received content. This allows for avoiding multiple transmissions of the same content request and corresponding content between the network component and the content server.

In addition to the content cache, the network component may also comprise a content proxy for receiving a content request from the mobile terminal and for transmitting a requested content to the mobile terminal in response to the content request. In particular, the content proxy may be configured to perform the following operations: If a copy of the requested content is not available in the content cache, the content proxy forwards the content request to the content server, receives the requested content from the content server, stores a copy of the received content in the content cache, and transmits the requested content to the mobile terminal on the basis of the received content. If a copy of the requested content is available in the content cache, the content proxy transmits the requested content to the mobile terminal on the basis of the copy and the content cache. In this way, it is avoided that the same content is multiply requested from the content server and bandwidth consumption is reduced.

According to an embodiment, the network-side agent is configured to select a communication link for transmitting the content to the mobile terminal from the group comprising at least a unicast connection and a multicast connection. In this way, bandwidth consumption may be further reduced by using multicast connections or even broadcast connections if the same content is to be transmitted to a plurality of mobile terminals. This concept can also be applied to the transmission of feeds to the mobile terminal.

According to a further embodiment, a mobile terminal for a mobile network is provided. The mobile terminal comprises a client for feed-based automatic reception of content from the mobile network, a feed cache for storing copies of feeds received from the mobile network, and a client-side agent for managing the feed-based reception of content in the mobile terminal. Only if the client is subscribed to a feed of which a copy is not available in the feed cache, the client-side agent generates a feed request to the mobile network, receives a requested feed from the mobile network in response to the feed request, and stores the received feed in the feed cache. Accordingly, by means of the client-side agent and the feed cache, the number of feed requests transmitted from the mobile terminal to the mobile network is reduced. Typically, the feed request will be transmitted from the mobile terminal if there is a new subscription to a feed. Nonetheless, in cooperation with the network-side agent of the above-described network component, feed updates are possible. As the control over the update process is within the mobile network and not within the mobile terminal, bandwidth consumption for communication between the mobile terminal and the mobile network is reduced. The client-side agent may be implemented as a function of the client. Preferably, the client-side agent is implemented separately from the client so that it is possible to use existing types of clients.

The mobile terminal may also comprise a feed proxy for receiving a feed request from the client and for transmitting a requested feed to the client in response to the feed request. In particular, the feed proxy may be configured to perform the following operations: If a copy of the requested feed is not available in the feed cache, the feed proxy forwards the feed request to the mobile network, receives the requested feed from the mobile network, stores the received in the feed cash, and transmits the requested feed to the client on the basis of the received feed. If a copy of the requested feed is available in the feed cache, the feed proxy transmits the requested feed to the client on the basis of the copy in the feed cache. By means of the feed proxy, the mobile terminal is more flexible with respect to the type of client. In particular, it is possible to use a client of existing type which periodically generates and transmits feed requests: As these feed requests are received and processed by the feed proxy of the client-side agent, only a reduced number of feed requests is actually transmitted from the mobile terminal, e.g. if there is a new subscription to a feed.

According to an embodiment, the mobile terminal further comprises a content cache for storing copies of contents received from the mobile network, and the client-side agent comprises a content proxy for receiving a content request from the client and for transmitting a requested content to the client in response to the content request. In particular, the content proxy is configured to perform the following operations: If a copy of the requested content is not available in the content cache, the content proxy forwards a content request to the mobile network, receives the requested content from the mobile network, stores a copy of the received content in the content cache, and transmits the requested content to the client on the basis of the received content. If a copy of the requested content is available in the content cache, the content proxy transmits the content to the client on the basis of the copy and the content cache. By means of the content cache and the content proxy, the number of content requests from the mobile terminal to the mobile network and the number of content transmissions in response to these requests can be further reduced.

In addition to the network component and to the mobile terminal as defined above, an embodiment of the invention also provides corresponding methods of feed-based automatic transmission and reception of content between a mobile network and a mobile terminal. Further, an embodiment of the invention provides a system for feed based automatic distribution of content via a mobile network which comprises a network component as defined above and at least one base station for establishing a communication link to at least one mobile terminal, the communication link being configurable as a unicast communication link or a multicast communication link.

Further, embodiments of the invention also relate to software-based implementations of the above concepts. For example, a computer program product may be provided which comprises a program code for performing the operations of the network component as defined above when the program code is executed on a computer system of the network component. Further, a computer program product may be provided which comprises a program code for performing the operations of the mobile terminal as defined above when the program code is executed on a computer system of the mobile terminal. The program code may be stored on a computer-readable recording medium. In this connection, it is to be understood that actually many network components of mobile networks and mobile terminals are actually based on computer systems and may be adopted to perform the operations as defined above by using a suitable program code. Accordingly, an embodiment of the invention also relates to an apparatus comprising a computer processor and a memory coupled to the computer processor, wherein the memory includes a program code which causes the apparatus to perform the operations of the network component as defined above or of the mobile terminal as defined above. Of course, it is also possible to implement the above concepts on the basis of hardware only or on the basis of a combination of hardware and software.

BRIEF DESCRIPTION OF THE DRAWINGS

FIG. 6 shows a diagram which illustrates a further exemplary sequence of signal transmission steps in a method of feed-based automatic distribution of content according to an embodiment of the invention.

DETAILED DESCRIPTION OF EMBODIMENTS

In the following description, exemplary embodiments of the invention will be described with respect to the accompanying drawings. It is to be understood that this description and the illustrations are merely exemplary and not intended to limit the scope of the invention. It will be apparent for the skilled person that the illustrated exemplary embodiments may be modified without departing from the concept of the invention. For example, the functional blocks as described below may be implemented using software in connection with a programmable processor or general purpose computer or by using dedicated hardware, as appropriate. Further, it is to be understood that the signal connections as illustrated hereinafter may be either direct connections or indirect connections.

Figure 1:
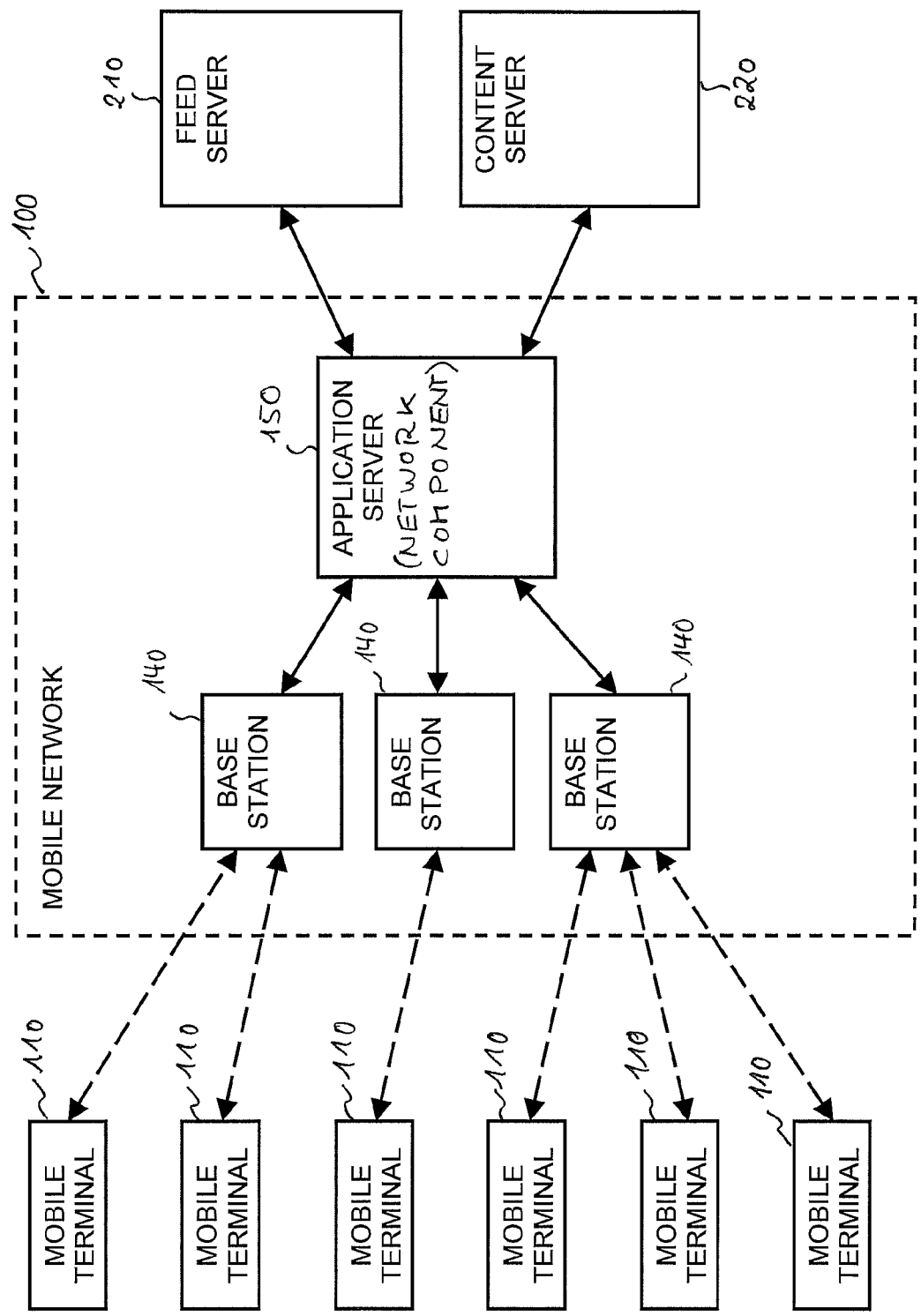
FIG. 1 illustrates a mobile network which is coupled to a feed server, to a content server and to a plurality of mobile terminals for accomplishing feed-based automatic distribution of content according to an embodiment of the invention.

FIG. 1 schematically illustrates a mobile network 100. The mobile network 100 is coupled to a plurality of mobile terminals 110 via wireless communication links (illustrated as dashed arrows). Further, the mobile network 100 is coupled to external network resources in the form of a feed server 210 and a content server 220. This coupling may be accomplished by a fixed communication link, e.g. an IP communication link (IP: Internet Protocol). In the following description, the feed server 210 and the content server 220 are assumed to be hosted by an external provider. However, it is also possible that a provider of the mobile network 100 is responsible for hosting the feed server 210 and the content server 220 as well. In this case, the feed server and the content server would be network components of the mobile network 100. Further, although the feed server 210 and the content server 220 have been illustrated as separate blocks, it is to be understood that the feed server 210 and the content server 220 may actually be located in the same network resource, e.g. in one computer system.

The mobile network 100 comprises a plurality of network components. As illustrated, one of these network components is an application server 150 which is used to provide application-related services for users of the mobile terminals 110. For example, the application server 150 may be used to provide services such as authentification or access to a database.

Other network components of the mobile network 100 comprise a plurality of base stations 140 which provide the wireless communication links between the mobile network 100 and the mobile terminals 110. Using the wireless communication links, the mobile terminals 110 may communicate with each other via the mobile network 100. Further, the mobile terminals 110 may communicate with network components of the mobile network 100, such as the application server 150. In addition, the mobile terminals 110 may also communicate with external network resources coupled to the mobile network 100, such as the feed server 210 and the content server 220. Finally, the mobile terminals 110 may also communicate with other mobile networks (not illustrated) which are coupled to the mobile network 100.

It is to be understood that the mobile network 100 may actually comprise a plurality of network components which are capable of communicating with the mobile terminals 110 and the external network resources in the same way as the application server 150. In FIG. 1, all components located on the same side of the wireless communication links as the base stations 140 may be referred to as network-side components.

The mobile network may a GSM mobile network or a UMTS mobile network. In other embodiments, other types of mobile networks can be used as well. In addition, as will be further explained in the following, the mobile network 100 is of a type which allows for multicast communication links between network components and the mobile terminals coupled to the mobile network 100. For example, multicast connections may be used between the application server 150 and the base stations 140 if the same data is to be transmitted to a plurality of mobile terminals 110 which are coupled to different base stations 140. Further, wireless multicast communication links may be used between one base station 140 and a plurality of mobile terminals 110 coupled thereto, if the same data is to be transmitted to these mobile terminals 110. In this connection, it is to be understood that using multicast communication link may also comprise the specific case of using a broadcast communication link, e.g. if the same data is to be transmitted to all base stations 140 coupled to the application server 150 or if the same data is to be transmitted to all mobile terminals 110 coupled to one of the base stations 140. In addition, the mobile network 100 may also use unicast connections, i.e. point-to-point connections, for establishing communication between network components and to the mobile terminals 110. Each network component 140, 150 may be configured to select an appropriate type of communication link between a unicast communication link, a multicast communication link or a broadcast communication link.

In the following, the process of automatic feed-based distribution of content via the mobile network 100 as illustrated in FIG. 1 will be explained. For this purpose, a content provider publishes new content by making it available on the content server 220. At the same time, an URI of the content server 220 is added to a feed which is available on the feed server 210. The feed contains references to contents available on the content server 220 or on other content servers. For example, the feed may correspond to the RSS specification or to the ATOM specification.

In each of the mobile terminals 110, a client may be provided for automatic feed-based reception of content. If a user of the mobile terminal 110 subscribes to a feed, an URI of the feed is added to the client of the mobile terminal 110, i.e. subscription information is generated that the client is subscribed to a feed which is available at the specified URI. The client then automatically receives the content referenced by this feed. In particular, if new content becomes available, it is automatically distributed to all subscribed clients on the basis of the updated feed.

In the following, components, functions and methods will be described which allow for efficiently controlling bandwidth usage in the mobile network 100 when automatically distributing content on the basis of feeds. For this purpose, reference will be made to one specific mobile terminal 110 and to one specific network component 150. According to the illustrated embodiment, control of the distribution process is essentially located in the network component 150. The mobile terminal 110 uses a known type of client and is further adapted to surrender control of the distribution process to the network component 150.

Figure 2:
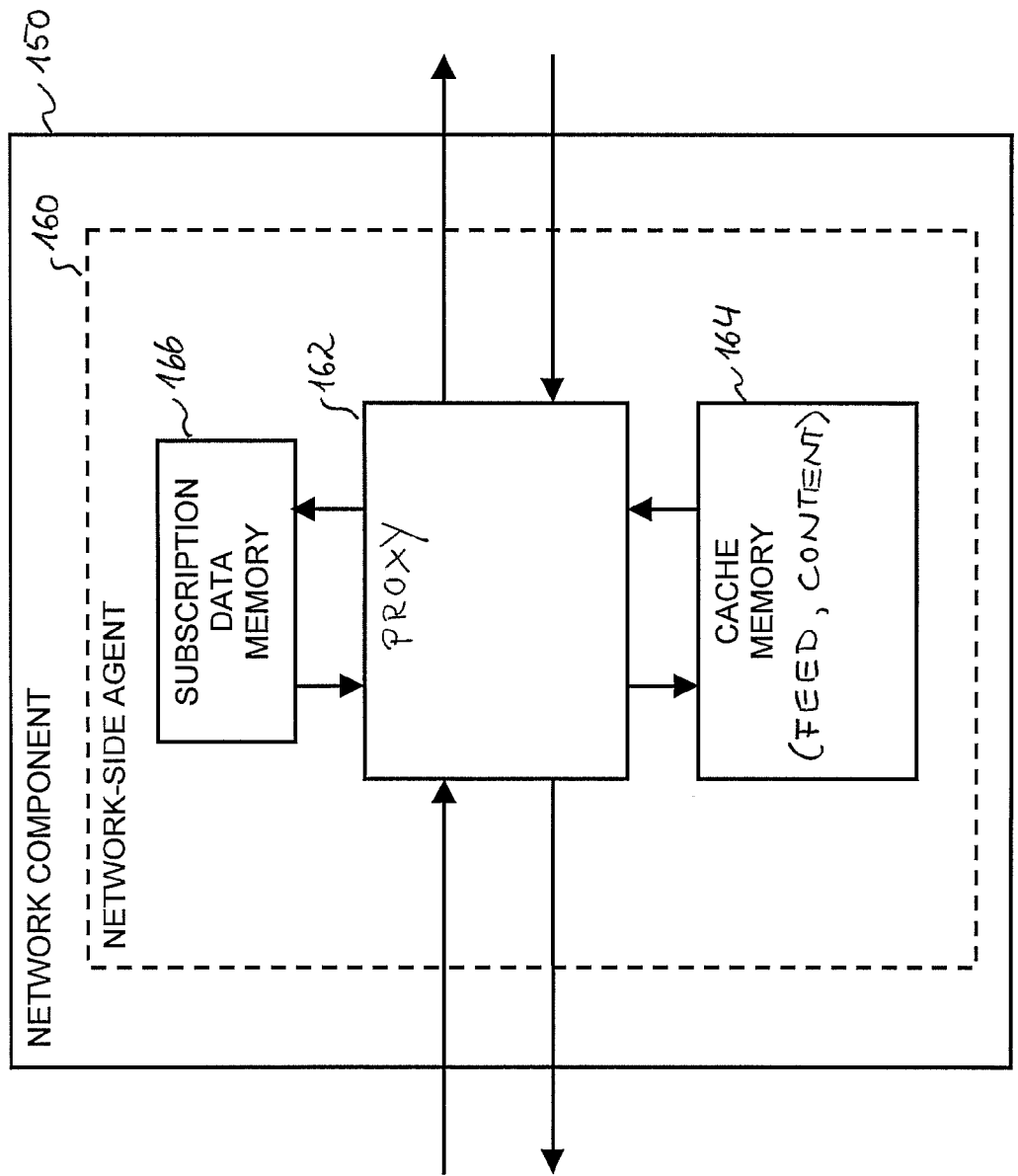
FIG. 2 schematically illustrates a network component according to an embodiment of the invention.

FIG. 2 schematically illustrates the structure of the network component 150 according to an embodiment of the invention. As illustrated, the network component 150 comprises a network-side agent 160 for managing the feed-based automatic transmission of content to the mobile terminal 110. For this purpose, the network-side agent on the one side communicates with the mobile terminal 110 and on the other side communicates with network resources such as the feed server 210 and the content server 220. The network-side agent 160 may be implemented by a program code stored in a memory of the network component 150 and executed by a processor of the network component 150.

The network-side agent 160 comprises a proxy 162. The proxy 162 receives feed requests from the mobile terminal 110 and transmits a requested feed in response to the feed request to the mobile terminal 110. Further, the proxy 162 receives content requests from the mobile terminal 110 and transmits a requested content in response to a content request to the mobile terminal 110. Accordingly, the proxy 162 may also be referred to as a feed proxy and a content proxy.

The network-side agent 160 further comprises a cache memory 164 for locally storing copies of feeds and contents. Accordingly, the cache memory 164 may also be referred to as a feed cache and as a content cache.

In addition, the network-side agent 160 comprises a subscription data memory 166. The subscription data memory 166 stores subscription information indicating to which feeds the client of the mobile terminal 110 is subscribed. For example, the subscription data memory may contain the URIs of the feeds to which the client of the mobile terminal 110 is subscribed. In fact, as the network component 150 may actually be coupled to a plurality of mobile terminals 110 which each may have a client for the automatic feed-based reception of content, the subscription data memory 166 actually comprises subscription information for each client of the mobile terminals 110.

The operation of the network-side agent 160 is as follows: On the basis of the subscription information in the subscription data memory 166 the network-side agent 160 periodically generates feed requests to the feed server 210 and receives feeds in response to the feed requests. Copies of the received feeds are stored in the cache memory 164. In this respect, the subscription information in the subscription data memory 166 is evaluated in such a way that a feed request is generated with respect to a specific feed if there is a subscription information in the subscription data memory 166 indicating that one of the clients of the mobile terminals 110 communicating with the network-side agent 160 is subscribed to the specific feed.

Further, the network-side agent 160 evaluates the received feeds with respect to the information. If a received feed contains new information, i.e. if it contains a new reference to a content, the network-side agent 160 also generates a content request to the content server 220 and receives the content in response to the content request. A copy of the received content is stored in the cache memory 164.

In this way, the network-side agent 160 autonomously operates so as to regularly check for updated feeds and, if there are updates, also autonomously retrieves the newly referenced content. Updated feeds and newly retrieved contents are then transmitted to the respective mobile terminals 110. As long as the network-side agent 160 has the correct subscription information, the client of the mobile terminal 110 will automatically receive updated feeds and new contents without issuing any feed requests or content requests. Accordingly, bandwidth consumption of the communication link between the network component 150 and the mobile terminal 110 is reduced. Further, the network-side agent 160 has control over the transmission process of feeds and contents to the mobile terminal 110. Accordingly, it is possible that suitable communication links are selected by the network component 150, e.g. unicast, multicast or broadcast communication links. Further, the transmission of feeds and contents may be subjected to certain criteria. For example, the network-side agent 160 may be configured to transmit a newly received feed to the mobile terminal 110 only if the feed contains new information. In this way, redundant transmission of data between the network component 150 and the mobile terminal 110 is avoided.

In addition, the network-side agent 160 may also receive feed requests from the mobile terminal 110 and forward the feed requests to the feed server 210. Similarly, the network-side agent 160 may receive content requests from the mobile terminal 110 and forward the content requests to the content server 220. For this purpose, the operations of the proxy 162 are as follows: When receiving a feed request from the mobile terminal 110, the proxy 162 evaluates whether a copy of the feed is stored in the cache memory 164. If no copy of the requested feed is available in the cache memory 164, the feed request is forwarded to the feed server 210, the requested feed is received from the feed server 210, and a copy of the received feed is stored in the cache memory. The proxy 162 responds to the feed request received from the mobile terminal 110 by forwarding the feed received from the feed server 210 to the mobile terminal 110. If a copy of the requested feed is available in the cache memory 164, the feed request is not forwarded to the feed server 210. Rather, the proxy 162 responds to the feed request received from the mobile terminal 110 by transmitting the copy of the feed which is stored in the cache memory 164.

When receiving a content request from the mobile terminal 110, the proxy 162 evaluates whether a copy of the requested content is available in the cache memory 164. If no copy of the requested content is available in the cache memory 164, the content request is forwarded to a content server 220, and the requested content is received from the content server 220. The received content is stored in the cache memory 164. The proxy 162 responds to the content request received from the mobile terminal 110 by forwarding the content received from the content server 220 to the mobile terminal 110. If a copy of the requested content is available in the cache memory 164, the proxy 162 responds to the content request received from the mobile terminal 110 by transmitting a copy of the requested content which is stored in the cache memory 164. Accordingly, bandwidth consumption on the communication link between the network component 150 and the feed server 210 can be reduced by processing of feed requests by the proxy 162. Further, bandwidth consumption on the communication link between the network component 150 and the content server 220 can be reduced by processing of content requests by the proxy 162. Due to the above processing of the feed requests and content requests, the proxy 162 is to be regarded as a non-transparent proxy.

Further, the network-side agent 160 is configured to generate the subscription information in the subscription data memory 166 on the basis of feed requests received from the mobile terminal 110. In particular, if a feed request is received from the mobile terminal 110, this is interpreted by the network-side agent as indication that the client of the mobile terminal 110 is subscribed to the requested feed. Accordingly, the respective subscription information may be generated and stored in the subscription data memory. In this way, the network-side agent 160 keeps track of feed requests issued by the client of the mobile terminal 110 so as to update the subscription data memory. When the client unsubscribes from a feed, this may be detected on the basis of an inactivity of the mobile terminal 110 with respect to a certain feed. For example, the network-side agent 150 may be provided with a timer, and when no feed request is received from the mobile terminal 110 for a certain time, the subscription information may be modified accordingly so as to indicate that the client of the mobile terminal 110 is no longer subscribed to the feed.

Figure 3:
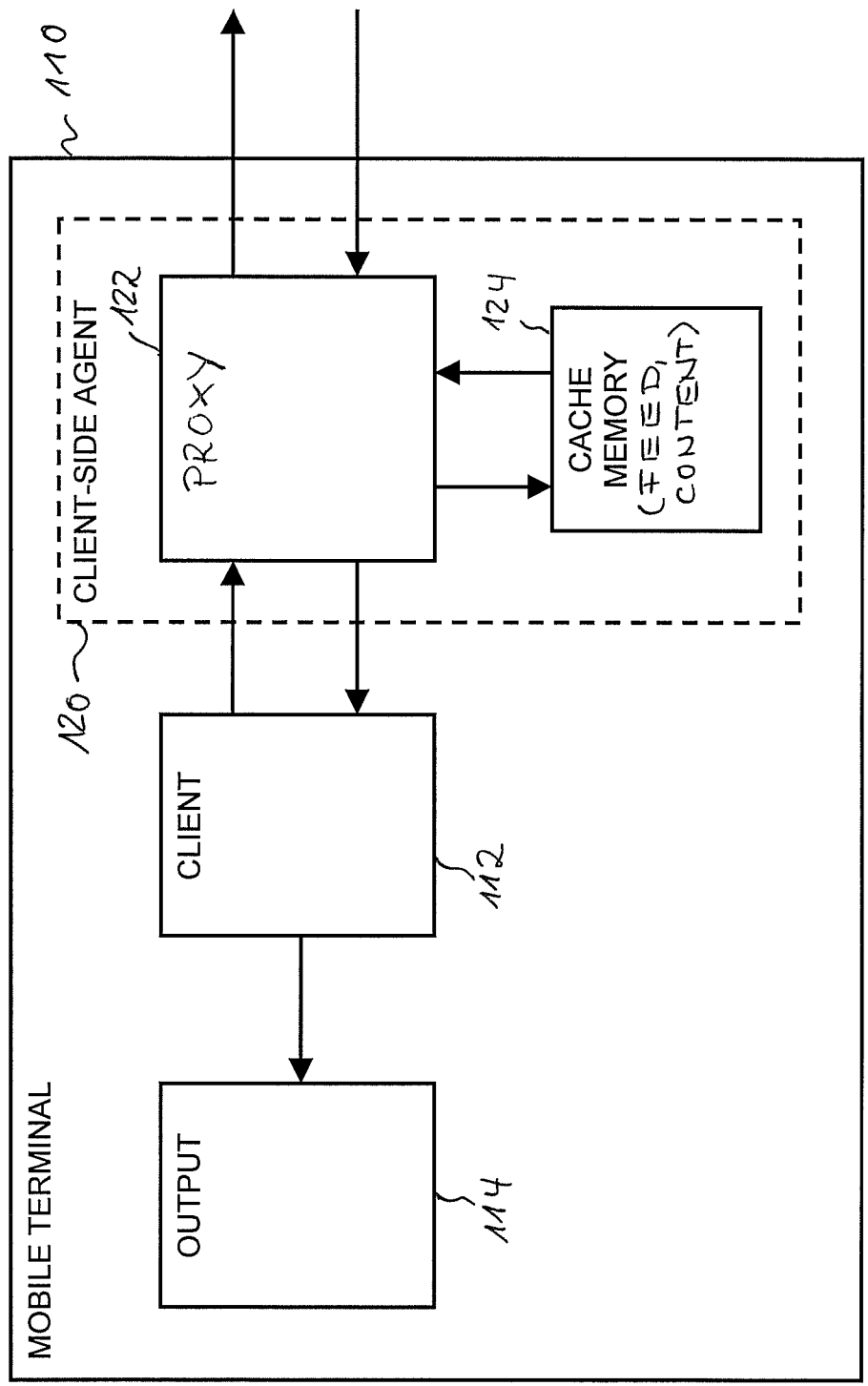
FIG. 3 schematically illustrates a mobile terminal according to an embodiment of the invention.

FIG. 3 schematically illustrates an implementation of the mobile terminal 110. As illustrated, the mobile terminal 110 comprises a client 112 for the feed-based reception of content in the mobile terminal 110. The client 112 may be a known RSS client, an ATOM client or the like. The client 112 maintains a subscription database indicating to which feeds the client 112 is subscribed. A user of the mobile terminal 110 may modify the subscription database by adding the URI of a feed to the subscription database or by removing the URI of a feed from the subscription database. On the basis of subscription information in this subscription database, the client 112 generates feed requests and transmits the feed requests towards the mobile network 100. In response to the feed requests, the client 112 receives feeds, evaluates the feeds, and if the feeds indicate that new content is available, the client 112 issues a content request so as to retrieve the new content. For outputting the content received by the client 112, the mobile terminal comprises an output device 114. Depending on the type of content, which is typically multimedia content comprising either audio data, video data or both, the output device 114 may be an audio device, a video device, or a combination thereof.

The mobile terminal 110 further comprises a client-side agent 120 which manages the feed-based automatic reception of content in the mobile terminal 110. The client 112 communicates with the mobile network 100 via the client-side agent 120. Accordingly, the client-side agent 120 has control over the feed requests and content request transmitted from the mobile terminal 110. In this way, the client-side agent 120 allows for reducing bandwidth consumption on the communication link between the mobile terminal 110 and the network component 150 by allowing only certain feed requests and content requests of the client 112 to be forwarded to the network component 150. As will be further explained in the following, the client-side agent 120 may be operated in such a way that a feed request is transmitted from the mobile terminal 110 only if a copy of the requested feed is not locally available in the mobile terminal 110 and that a content request is transmitted from mobile terminal 110 only if a copy of the requested content is not locally available in the mobile terminal 110. As in connection with the network component 150 and network-side agent 160 described in connection with FIG. 3 updated feeds and new contents are automatically transmitted from the network component 150 to the mobile terminal 110 without requiring respective feed requests and content requests from the mobile terminal 110, a significant reduction of bandwidth consumption on the communication link between the mobile terminal 110 and the network component 150 can be obtained.

As illustrated in FIG. 3, the client-side agent 120 comprises a proxy 122. The proxy 122 receives feed requests from the client 112 and, in response to the feed requests, transmits requested feeds to the client 112. Further, the proxy 122 receives content requests from the client 112 and, in response to the content requests, transmits requested contents to the client 112. Accordingly, the proxy 122 may also be referred to as a feed proxy and a content proxy.

In addition, the client-side agent 120 comprises a cache memory 124. The cache memory 124 is used for locally storing copies of feeds and contents received in the mobile terminal 110. Accordingly, the cache memory 124 may also be referred to as a feed cache and a content cache.

As regards the processing of feed requests and content requests, the operation of the proxy 122 is as follows: When receiving a feed request from the client 112, the proxy 122 evaluates whether a copy of the requested feed is locally available in the cache memory 124. If a copy of the requested feed is not available in the cache memory 124, the feed request from the client 112 is forwarded to the mobile network 100, in particular to the network component 150 and the network-side agent 160. In response to the feed request, the proxy 122 then receives the requested feed from the mobile network 100, and a copy of the feed is stored in the cache memory 124. The proxy 122 responds to the feed request from the client 112 by forwarding the feed received from the mobile network 100 to the client 112. If a copy of the requested feed is available in the cache memory 124, the proxy 122 responds to the feed request by transmitting the stored copy to the client 112.

When the proxy 122 receives a content request from the client 112, the proxy 122 evaluates whether a copy of the requested content is available in the cache memory 124. If a copy of the requested content is not available in the cache memory 124, the content request received from the client 112 is forwarded to the mobile network 100, in particular to the network component 150 and to the network-side agent 160. In response to the content request, the proxy 122 receives the requested content, and a copy of the content is stored in the cache memory 124. The proxy 122 responds to the content request by forwarding the content received from the mobile network 100 to the client 112.

For facilitating monitoring of subscribing and unsubscribing processes by the network-side agent 160, the client-side agent 120 may be provided with a timer. If no feed requests or content requests are received by the client-side agent for a certain period of time, the client-side agent 120 may transmit a corresponding message to the network-side agent 160. The network-side agent 160 may then modify the subscription information in the subscription data memory 166 so as to indicate that the client 112 of the mobile terminal 110 is no longer subscribed to this feed. Further, the client-side agent can also be configured to delete a feed from the cache memory 124 after a certain period of time. If the client 112 is still subscribed to the feed and checks for updates, the feed request would need to be forwarded to the mobile network 100 and to the network-side agent 160. In this way, a minimum activity of the mobile terminal 110 with respect to a feed to which the client 112 is subscribed can be enforced and this minimum activity can be used by the network-side agent 160 so as to detect whether the client 112 of the mobile terminal 110 is still subscribed to a feed before transmitting a feed or content referenced in the feed to the mobile terminal 110.

By processing the feed requests and content requests as described above, bandwidth consumption of the communication link between the mobile terminal 110 and the mobile network 100 is significantly reduced. Further, the use of the proxy 122 in the client-side agent allows for using different types of clients for feed-based automatic reception of content, including those of a known type which periodically transmit feed requests so as to check for updates.

It is to be understood that the foregoing illustrations of the network component 150 and the mobile terminal 110 are merely schematic and are given on the basis of functional blocks. In terms of physical apparatuses, the network component 150 may correspond to a computer system adapted for network applications and the mobile terminal 110 may correspond to a mobile phone, a hand-held computer or the like.

The operation of the mobile terminal 110 and the network component 150, in particular with respect to the cooperation of the client-side agent 120 and the network-side agent 160 as back-to-back agents will now be further explained by referring to exemplary sequences of signal transmission steps as illustrated in the diagrams of FIG. 4-9. In these figures, the arrow on the left side designated by t visualizes the course of time. However, it is to be understood that this time axis is not to scale and may not be used to calculate time intervals between the individual signal transmission steps.

Figure 4:
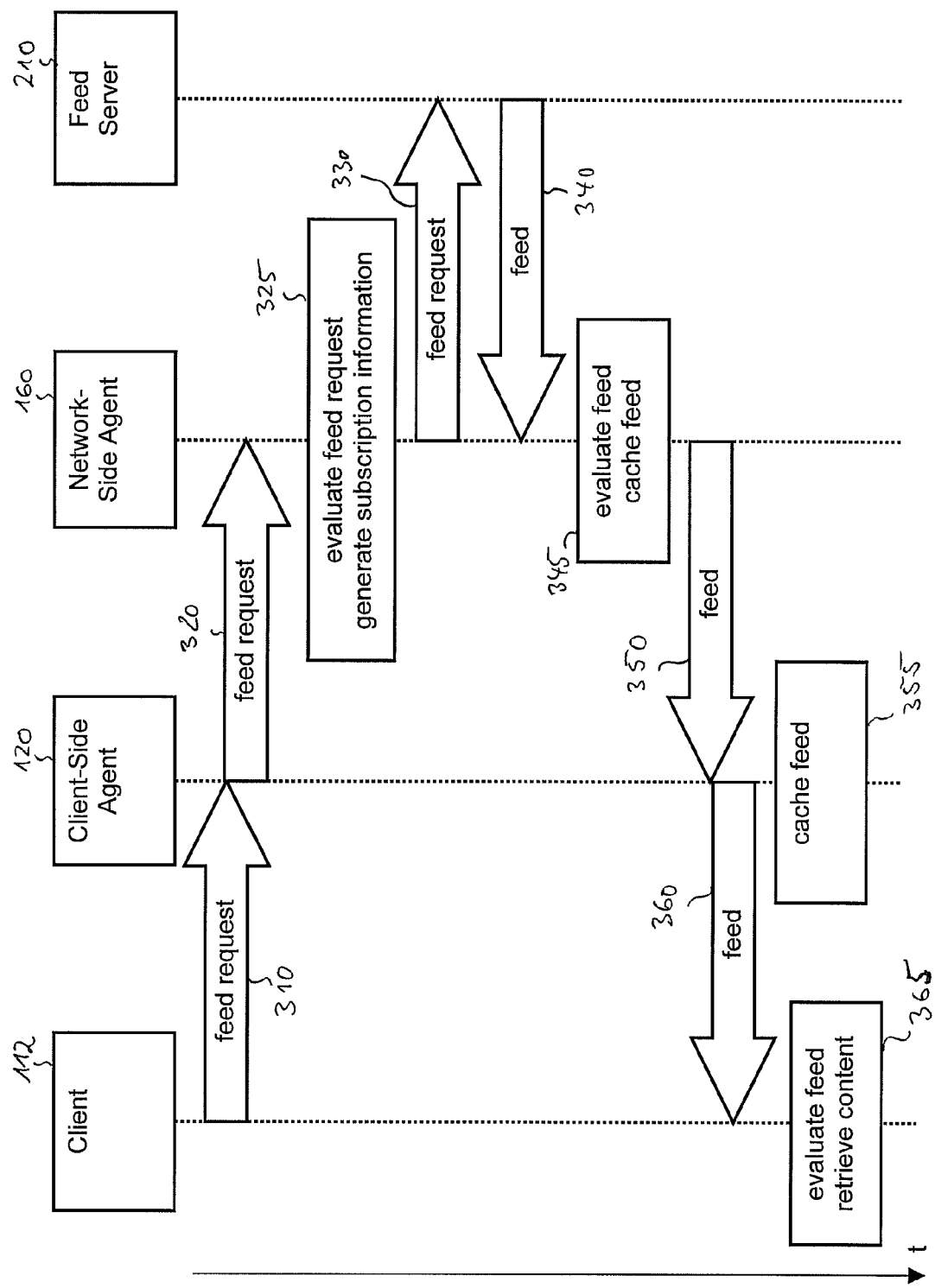
FIG. 4 shows a diagram which illustrates an exemplary sequence of signal transmission steps in a method of feed-based automatic distribution of content according to an embodiment of the invention.

In FIG. 4, a situation is illustrated in which the client 112 subscribes to a new feed. As explained above, this involves adding new subscription information to the subscription data base of the client 112.

Then, at step 310, a feed request is transmitted from the client 112. The feed request is received by the client-side agent 120. As a copy of the requested feed is not locally available in the mobile terminal 110, the feed request is forwarded to the mobile network 100 in step 320.

In the mobile network 100, the feed request is received by the network component 150, in particular by the network-side agent 160. In step 325, the network-side agent 160 evaluates the received feed request and generates subscription information, as the received feed request indicates that the client 112 of the mobile terminal 110 has newly subscribed to the requested feed.

As the requested feed is not locally available in the network-side agent 160, in step 330, the feed request is forwarded to the feed server 210. In step 340, the feed server 210 transmits the requested feed to the network component 150. The requested feed is received by the network-side agent 160.

In step 345, network-side agent 160 evaluates the received feed and caches the feed by storing a copy in the cache memory 164.

In step 350, the feed is forwarded from the network-side agent 160 to the mobile terminal 110. The feed is received by the client-side agent 120 and, in step 255, cached by storing a copy in the cache memory 124.

In step 360, the feed is forwarded from the client-side agent 120 to the client 112. In step 365, the client 112 evaluates the feed and retrieves content referenced by the feed.

In the above sequence of signal transmission steps, the network-side agent may select in which way the feed is forwarded to the client-side agent 120 in step 350. For example, the feed may immediately be forwarded to the client-side agent 120 using a unicast communication link. Alternatively, if immediately forwarding the feed is not desirable in view of available bandwidth resources, the network-side agent may also forward the feed at a later point of time. Further, if the same feed is requested by a plurality of clients 112, a multicast or broadcast communication link may be used for forwarding the feed.

Figure 5:
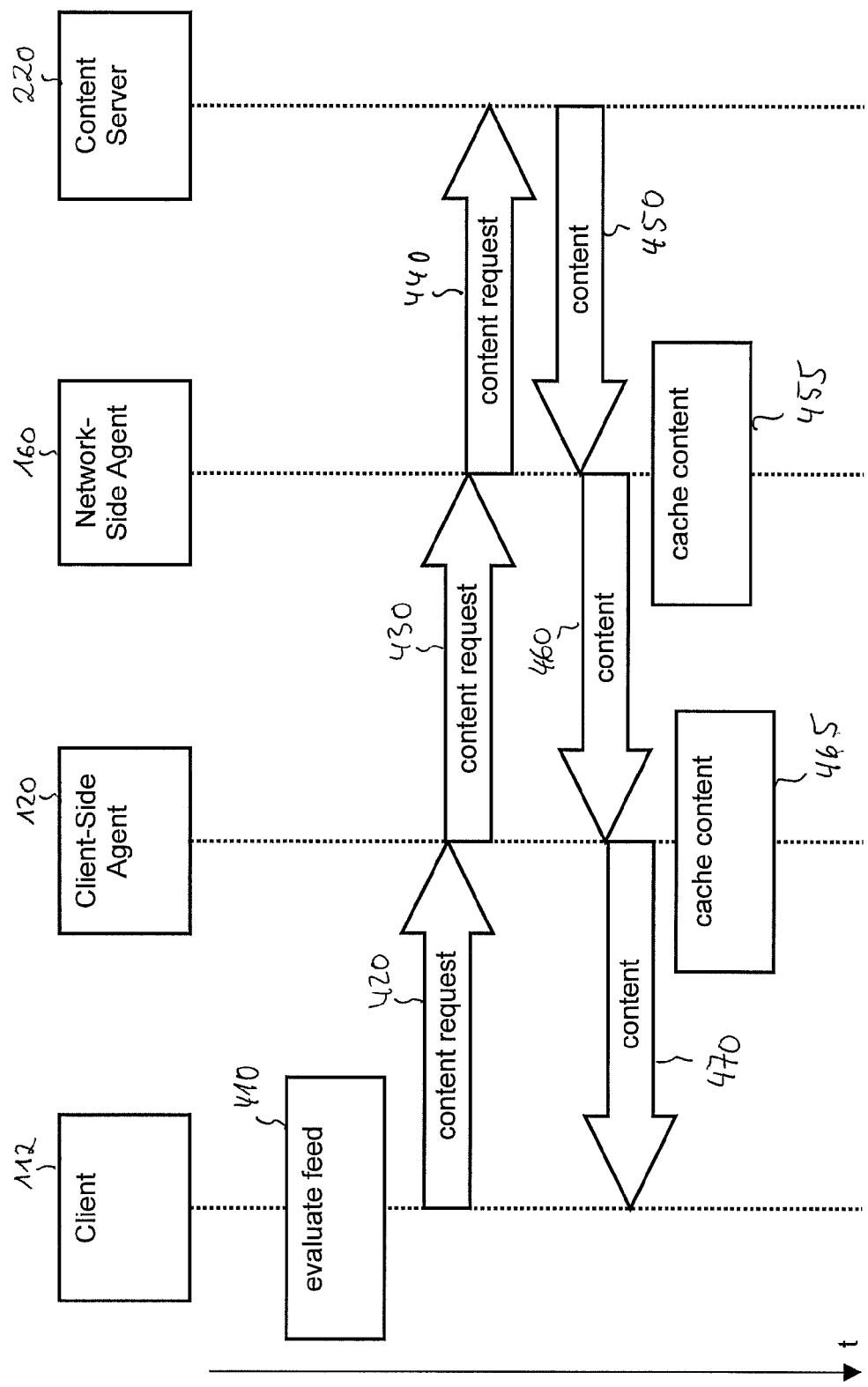
FIG. 5 shows a diagram which illustrates a further exemplary sequence of signal transmission steps in a method of feed-based automatic distribution of content according to an embodiment of the invention.

In FIG. 5, an exemplary situation is illustrated in which the client 112 requests a content in response to evaluating a newly received feed. In particular, the sequence of signal transmission steps of FIG. 5 may follow a sequence of signal transmission steps as illustrated in FIG. 4.

In step 410, the feed is evaluated. In step 420, content referenced by the feed is requested by transmitting a content request from the client 112. The content request is received by the client-side agent 120.

As the requested content is not locally available in the mobile terminal 110, the client-side agent 120 forwards the content requests to the mobile network 100 in step 430. The content request is received by the network-side agent 160.

As the requested content is not locally available in the network component 150, the network-side agent 160 forwards the content request to the content server 220 in step 440. In step 450, the content server 220 transmits the requested content to the network component 150. The requested content is received by the network-side agent 160. In step 455, the received content is cached by storing a copy in the cache memory 164.

In step 460, the network-side agent transmits the requested content to the mobile terminal 110. The content is received by the client-side agent 120. In step 465, the client-side agent 120 caches the received content by storing a copy in the cache memory 124. In step 470, the content is forwarded to the client 112.

In the sequence of signal transmission steps of FIG. 5, the network-side agent 160 has control over the transmission of the content to the mobile terminal 110 in step 460. As appropriate, the content 460 may be transmitted immediately or at a later point of time. Further, a unicast communication link, a multicast communication link or a broadcast communication link may be selected for transmitting a content, depending on the number of mobile terminals 110 requesting the same content.

In FIG. 6, an exemplary situation is illustrated in which the network-side agent 160 autonomously checks for updates of a feed. For this purpose, the network-side agent 160 evaluates the subscription information stored in the subscription data memory 122. If the evaluation indicates that the client 112 is subscribed to a particular feed, the network-side agent 160 autonomously generates a feed request and transmits the feed request to the feed server 210 in step 520. In step 530, the feed server 210 responds to the feed request by transmitting the requested feed. The feed is received by the network-side agent 160.

In step 535, the received feed is evaluated and cached by storing a copy in the cache memory 164. If the evaluation indicates that the feed contains new information in the form of a new reference to a content, the network-side agent 160 proceeds to retrieve the content and caches the content.

In step 540, the feed and the retrieved content are transmitted to the mobile terminal 110. The feed and the content are received by the client-side agent 120. In step 545, the client-side agent 120 caches the feed and the content by storing copies in the cache memory 124.

In the sequence of signal transmission steps of FIG. 6, the network-side agent 160 has control over the transmission of the feed and the content in step 540. For example, the network-side agent 160 may decide to transmit the feed and the content in a single transmission. Alternatively, the feed and the content may be transmitted in separate transmissions. A unicast communication link, a multicast communication link, or a broadcast communication link may be selected by the network-side agent 160 for transmitting the feed and the content depending on the number of clients for which the subscription information indicates that they are subscribed to the feed.

Further, in the sequence of signal transmission steps of FIG. 6, the evaluation of the feed in step 535 may also indicate that the feed contains new information which is not a new reference to a content. In this case, it is not necessary to retrieve content, in step 540 only the feed is transmitted to the mobile terminal 110, and in step 545 only the feed is cached.

Figure 7:
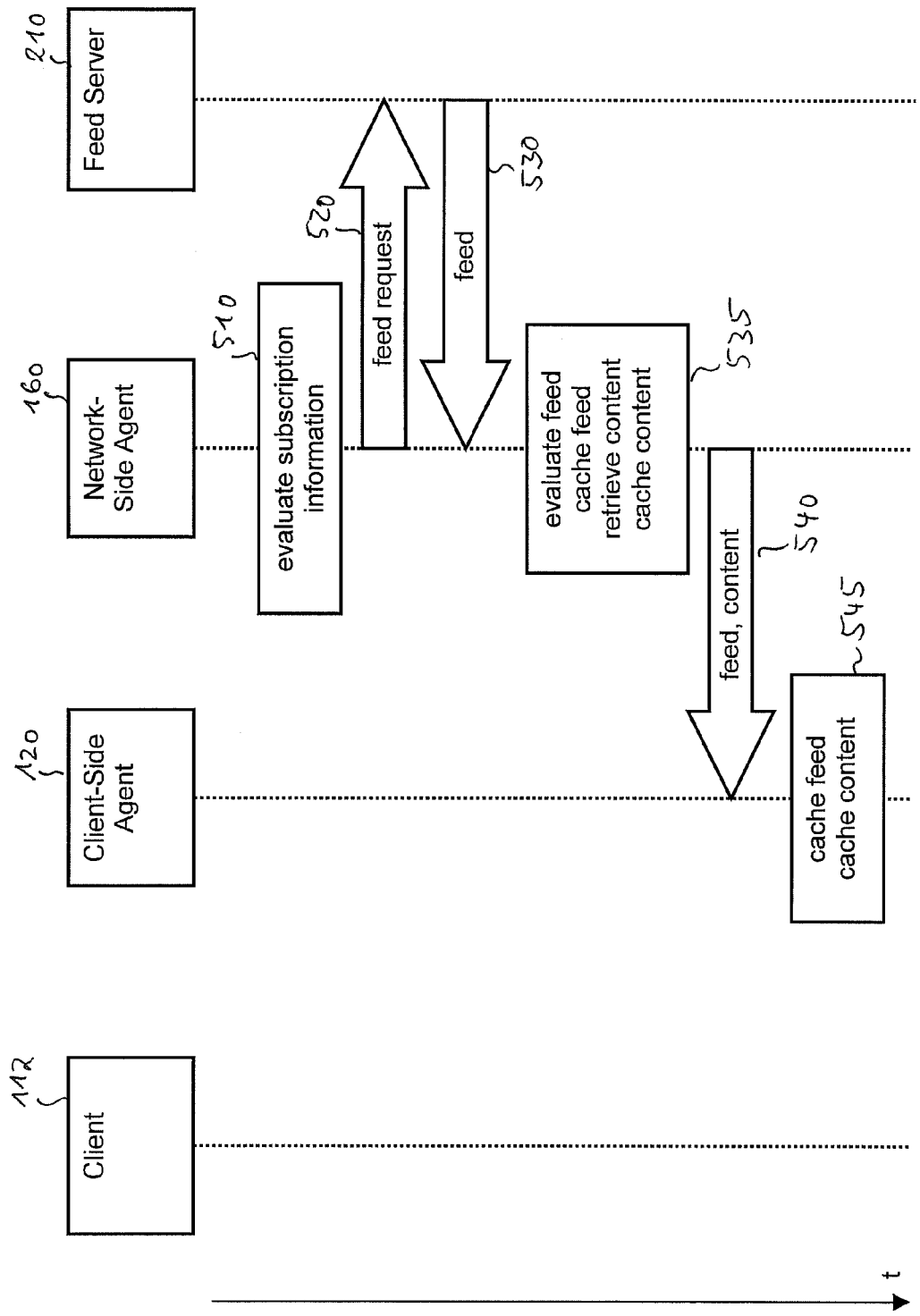
FIG. 7 shows a diagram which illustrates a further exemplary sequence of signal transmission steps in a method of feed-based automatic distribution of content according to an embodiment of the invention.
Figure 7:
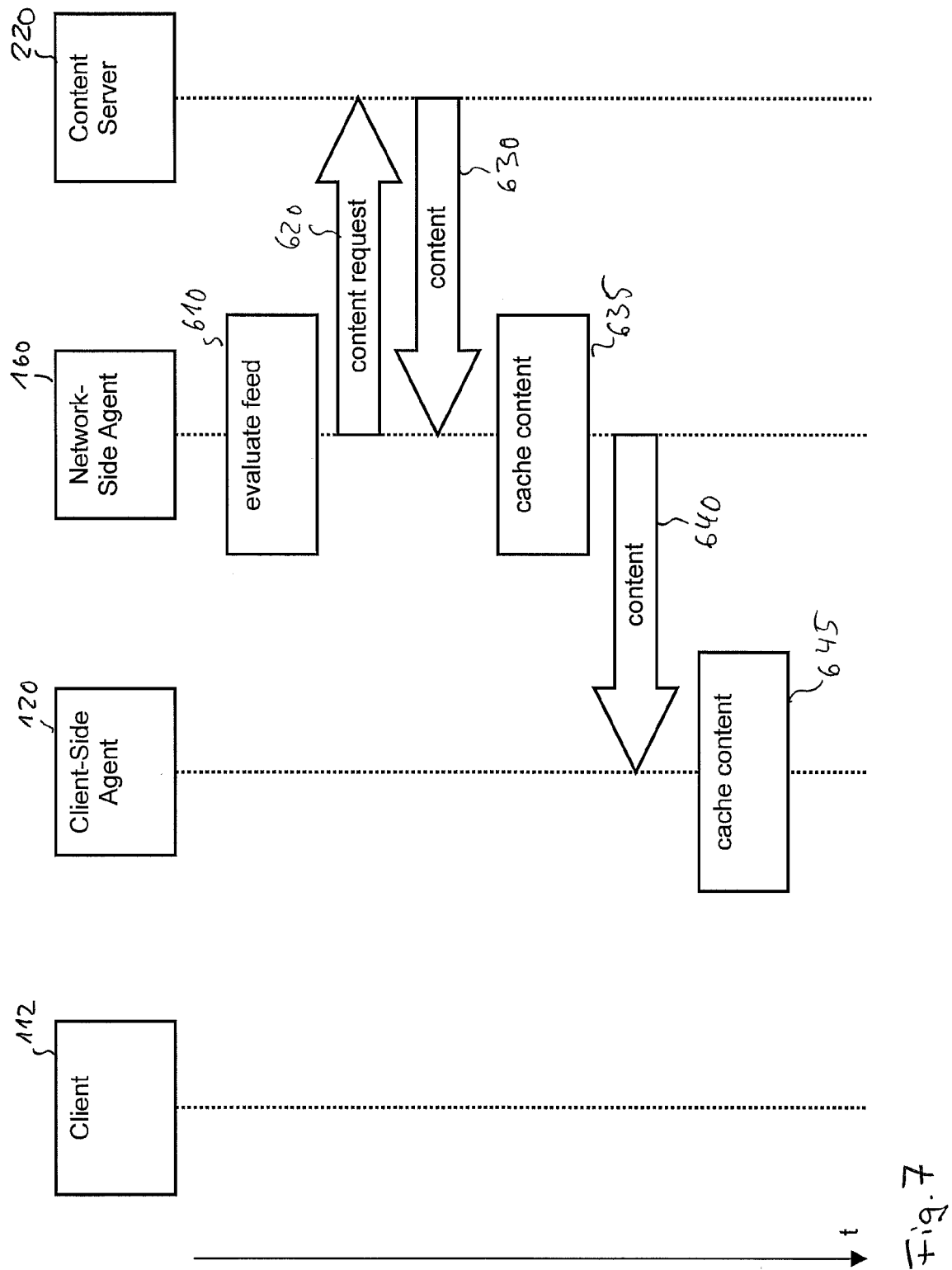

In FIG. 7, an exemplary situation is illustrated in which the network-side agent 160 autonomously requests content from the content server 220 on the basis of a newly received feed. For example, the sequence of signal transmission steps of FIG. 7 may be used when retrieving content in step 535 of FIG. 6.

In step 610, the network-side agent evaluates the feed and, if the feed contains new information in the form of a new reference to a content, the content is requested by transmitting a content request to the content server 220 in step 620. In step 630, the content server 220 responds to the content request by transmitting the requested content to the network component 150. The content is received by the network-side agent 160.

In step 635, the network-side agent 160 caches the content by storing a copy in the cache memory 164. In step 640, the content is transmitted to the mobile terminal 110. The content is received by the client-side agent 120 and cached in step 645 by storing it in the cache memory 124.

Again, the network-side agent 160 has control over the transmission of the content to the mobile terminal in step 640. A suitable point of time may be selected for the transmission. Further, a multicast communication link or a broadcast communication link may be selected for the transmission if the subscription information in the subscription data memory 162 of the network-side agent 160 indicates that the same content is to be transmitted to a plurality of mobile terminals 110.

Figure 8:
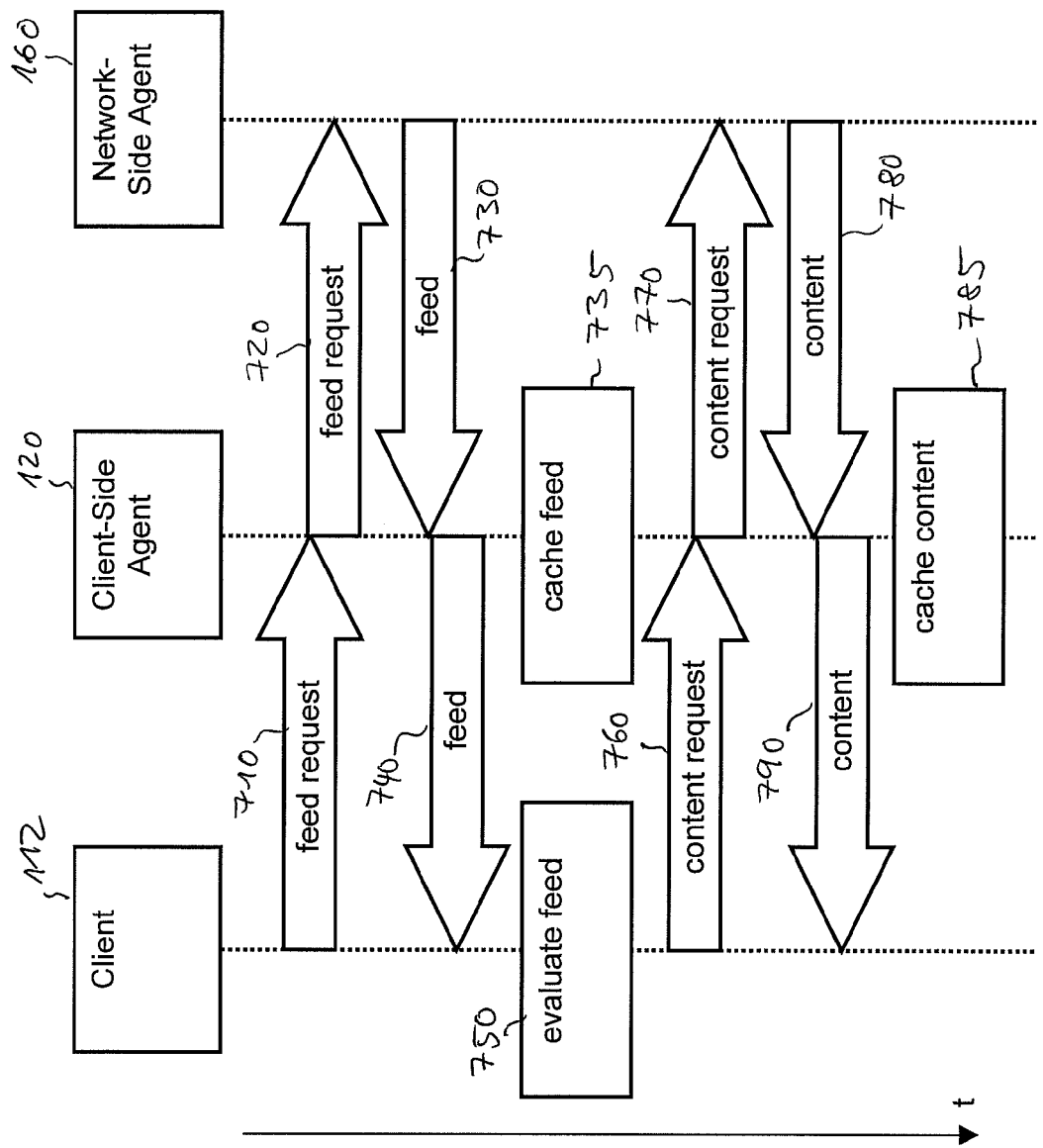
FIG. 8 shows a diagram which illustrates a further exemplary sequence of signal transmission steps in a method of feed-based automatic distribution of content according to an embodiment of the invention.

In FIG. 8, an exemplary situation is illustrated in which the client 112 subscribes to a feed which is already available in the network-side agent 160. For example, this may be the case if clients of other mobile terminals have previously subscribed to the same feed.

In step 710, a feed request is transmitted from the client 112. The feed request is received by the client-side agent 122. As a copy of the requested feed is not available in the mobile terminal, the client-side agent 122 forwards the feed request to the mobile network in step 720. The network-side agent 160 receives the feed request.

As a copy of the requested feed is available in the network-side agent 160, the network-side agent 160 responds to the feed request in step 730 by transmitting the copy of the feed which is stored in the cache memory 164 to the mobile terminal 110. The feed is received by the client-side agent 120.

In step 735, the client-side agent caches the feed by storing a copy in the cache memory 124. In step 740, the client-side agent 120 forwards the feed to the client 112.

In step 750, the client 112 evaluates the feed and requests content referenced in the feed by transmitting a content request in step 760. The content request is received by the client-side agent 120. As a copy of the requested content is not available in the mobile terminal 110, the client-side agent 120 proceeds by forwarding the content request to the mobile network in step 770. In the mobile network 100, the content request is received by the network-side agent 160.

As a copy of the requested content is available in the cache memory 164 of the network-side agent 160, the network-side agent 160 proceeds by transmitting the content to the mobile terminal 110 on the basis of the stored copy. The content is received by the client-side agent 120. In step 785, the client-side agent 120 caches the received content by storing a copy in the cache memory 124. In step 790, the client-side agent 120 transmits the content to the client 112.

In the exemplary sequence of signal transmission steps of FIG. 8, the network-side agent 160 has control over the transmission of the feed in step 730 and over the transmission of the content in step 780. In particular, the network-side agent 160 may select a suitable point of time and a suitable type of communication link for the transmission. Again, the communication link may be selected between a unicast connection, a multicast connection and a broadcast connection, depending on the number of other mobile terminals 110 to which the same feed or content is to be transmitted.

Figure 9:
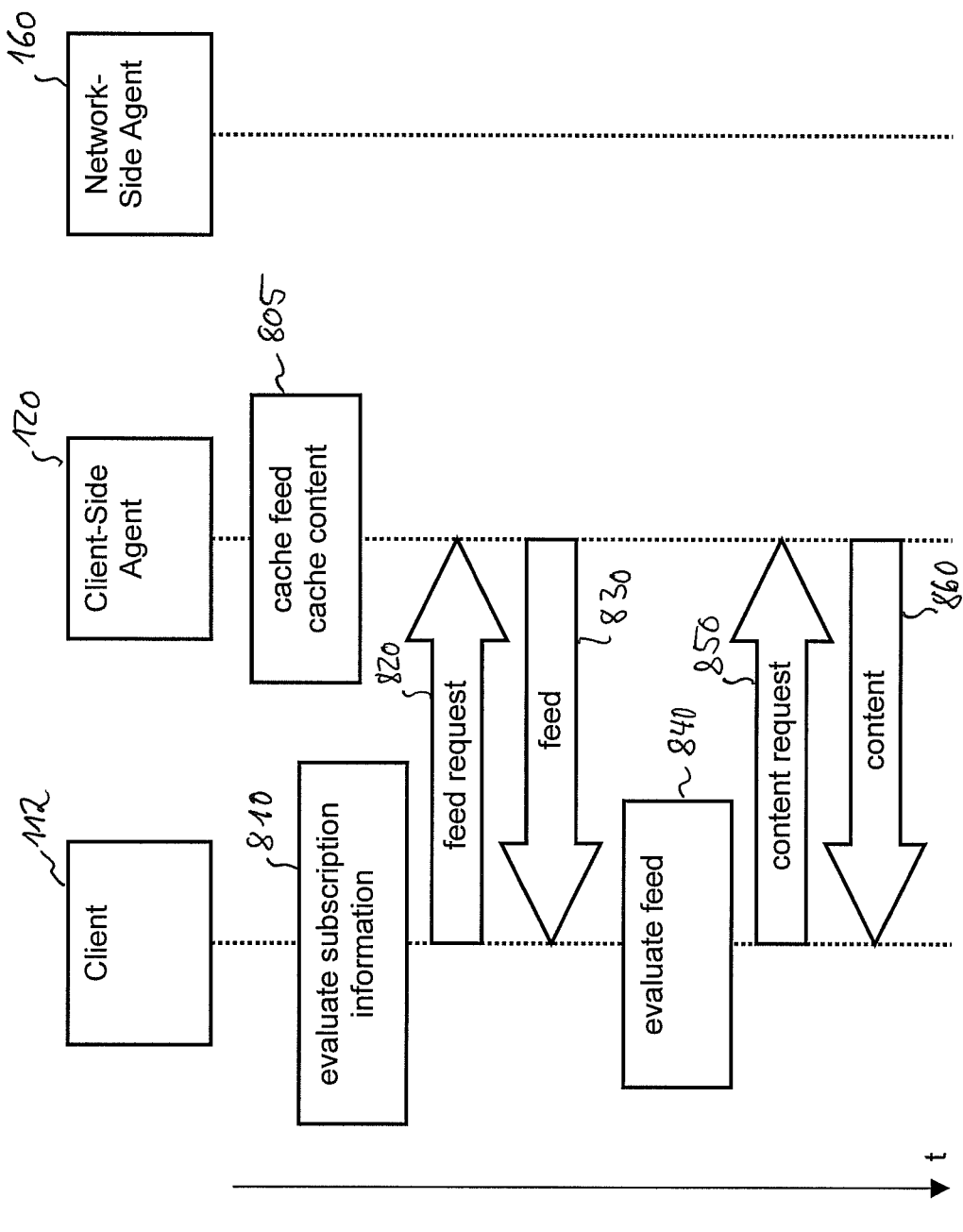
FIG. 9 shows a diagram which illustrates a further exemplary sequence of signal transmission steps in a method of feed-based automatic distribution of content according to an embodiment of the invention.

FIG. 9 illustrates an exemplary situation in which the client 112 checks for updates of a feed to which it is already subscribed. The client 112 corresponds to a known type of client which periodically generates feed requests for feeds to which it is subscribed. In step 810, the subscription information in the subscription data base of the client 112 is evaluated and a feed request is transmitted from the client 112 in step 820. As the client 112 is already subscribed to the feed, a copy of the requested feed and a copy of the referenced content have already previously been cached by the client-side agent 120, e.g. during procedures as illustrated in FIGS. 4-8.

As the requested feed is thus already available in the mobile terminal 110, the client-side agent 120 responds to the feed request of the client 112 by transmitting the requested feed in step 830 on the basis of the copy stored in the cache memory 124. The feed request is not forwarded to the network-side agent 160.

In step 840, the client 112 evaluates the feed and, on the basis of the evaluation, proceeds with step 850 in which a content request is transmitted by the client 112. The content request is received by the client-side agent 120. As a copy of the requested content is available in the mobile terminal 110, the client-side agent 120 proceeds by transmitting the requested content 860 to the client 112 on the basis of the copy stored in the cache memory 124. The content request is not forwarded to the network-side agent 160.

Accordingly, in the sequence of transmission steps of FIG. 9, the client 112 may obtain updated feeds and content without requiring that feed requests or content requests are issued from the mobile terminal 110. Bandwidth consumption on the communication link between the mobile terminal 110 and the mobile network 100 is thus reduced. Further, as the client 112 may still issue feed requests and content requests in a known manner, compatibility with existing types of clients is achieved.

Figure 10:
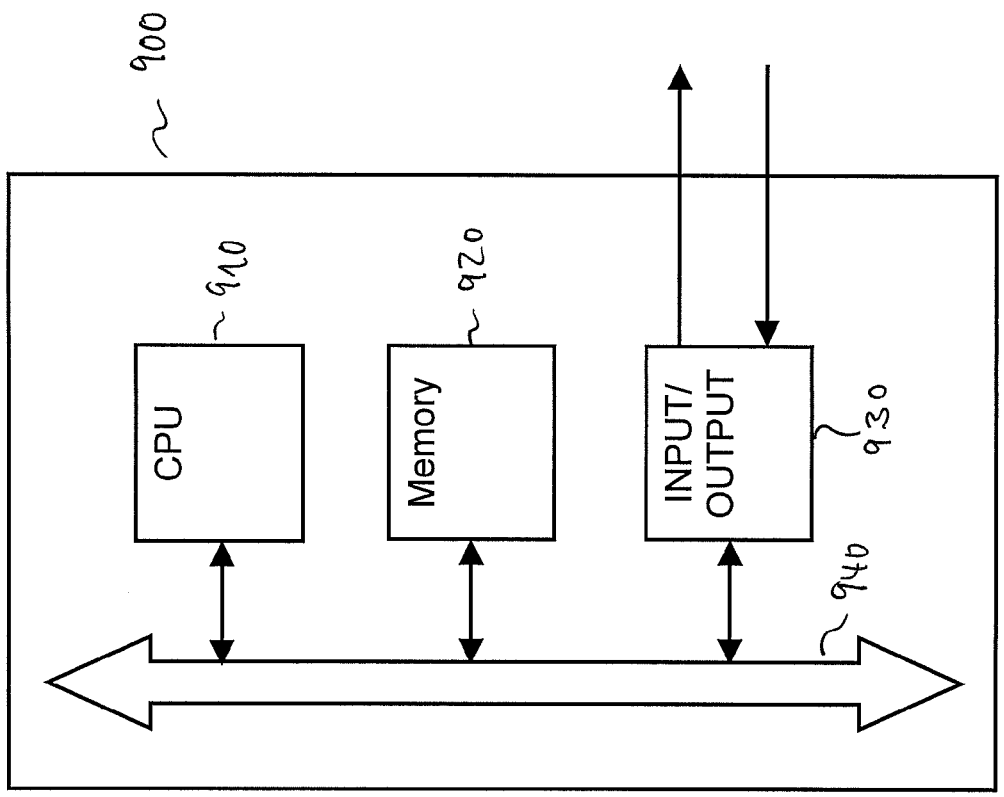
FIG. 10 schematically illustrates a computer-based apparatus as used in a technique of feed-based automatic distribution of content according to an embodiment of the invention.

FIG. 10 schematically illustrates a computer-based apparatus which may be used to implement the above-described functions of the mobile terminal 110 or of the network component 150. The apparatus comprises a processor or CPU (CPU: Central Processing Unit), a memory, e.g. a random access memory or other type of storage device, and an input/output unit 930 for establishing communication with respect to external components. Further, the apparatus 900 comprises a bus 940 for coupling the processor 910, the memory 920 and the input/output unit 930 to each other. By storing a suitably designed program code in the memory 920 and executing the program code by the processor 910, the above-described functions of the mobile terminal 110 or of the network component 150 may be implemented.

It is to be understood that the above-described embodiments are merely illustrative and intended to provide a better understanding of the invention. The skilled person will understand how to make modifications in order to meet specific application requirements. For example, although the feed and contents were described to be stored in a single cache memory, it is also possible to implement a feed cache and a content cache by using separate memories. Similarly, although in the above-described embodiments a single proxy was used for both processing feed requests and content requests, a separate feed proxy and separate content proxy may be provided. In addition, the above-described concepts may also be applied without providing a dedicated client-side agent within the mobile terminal. Rather, functions of the client-side agent may also be implemented within the client. In this case, proxy would not be required in the mobile terminal.

The invention claimed is:

1. A network component for use in a mobile network, the network component comprising:
a network-side agent for managing feed-based automatic transmission of content to a mobile terminal;
wherein the network-side agent is remote from the mobile terminal and is configured to:
periodically generate a feed request and transmit the feed request to a feed server on behalf of the mobile terminal;
receive a requested feed from the feed server in response to the feed request; and
selectively transmit the received feed to the mobile terminal.

2. The network component according to claim 1, wherein the network-side agent is configured to transmit the received feed to the mobile terminal only if the received feed contains new information.

3. The network component according to claim 1:
wherein the network-side agent is configured to generate subscription information on the basis of a feed request received from the mobile terminal, the subscription information indicating that a client of the mobile terminal is subscribed to the requested feed; and
wherein the network-side agent is configured to transmit the feed request to the feed server on the basis of the subscription information.

4. The network component according to claim 1, further comprising a feed cache for storing a copy of the received feed.

5. The network component according to claim 4, further comprising:
a feed proxy for receiving a feed request from the mobile terminal and for transmitting a requested feed to the mobile terminal in response to the feed request;
wherein the feed proxy is configured to:
if a copy of the requested feed is not available in the feed cache, forward the received feed request to the feed server, receive the requested feed from the feed server, store the received feed in the feed cache, and transmit the requested feed to the mobile terminal on the basis of the received feed; and
if a copy of the requested feed is available in the feed cache, transmit the requested feed to the mobile terminal on the basis of the copy in the feed cache.

6. The network component according to claim 1, wherein the network-side agent is configured to:
generate a content request and transmit the content request to a content server on the basis of the received feed;
receive requested content from the content server in response to the content request; and
transmit the received content to the mobile terminal.

7. The network component according to claim 6, further comprising a content cache for storing the received content.

8. The network component according to claim 7, further comprising:
a content proxy for receiving a content request from the mobile terminal and for transmitting the requested content to the mobile terminal in response to the content request;
wherein the content proxy is configured to:
if a copy of the requested content is not available in the content cache, forward the received content request to a content server, receive the requested content from the content server, store a copy of the received content in the content cache, and transmit the requested content to the mobile terminal on the basis of the received content; and
if a copy of the requested content is available in the content cache, transmit the requested content to the mobile terminal on the basis of the copy in the content cache.

9. The network component according to claim 6, wherein the network-side agent is configured to select a communication link for transmitting the content to the mobile terminal from a group comprising at least a unicast communication link and a multicast communication link.

10. A system for feed based automatic distribution of content via a mobile network, comprising:
a network component for use in the mobile network and comprising:
a network-side agent for managing feed-based automatic transmission of content to a mobile terminal;
wherein the network-side agent is remote from the mobile terminal and is configured to:
periodically generate a feed request and transmit the feed request to a feed server on behalf of the mobile terminal;
receive a requested feed from the feed server in response to the feed request; and
selectively transmit the received feed to the mobile terminal; and
at least one base station for establishing a communication link between the network component and at least one mobile terminal;
wherein the communication link is selected from the group comprising at least a unicast communication link and a multicast communication link.

11. A method of feed-based automatic transmission of content from a mobile network to a mobile terminal, the method comprising:
periodically generating a feed request in a network-side component, the network side component being remote from the mobile terminal;
the network side component transmitting the feed request to a feed server on behalf of the mobile terminal;
in response to the feed request, receiving a requested feed from the feed server in the network-side component; and
selectively transmitting the received feed from the network-side component to the mobile terminal.

12. The method according to claim 11, wherein the received feed is selectively transmitted from the network-side component to the mobile terminal only if the received feed contains new information.

13. The method according to claim 11, further comprising:
generating subscription information in the network-side component on the basis of a feed request received from the mobile terminal, the subscription information indicating that a client of the mobile terminal is subscribed to the requested feed; and
generating the feed request on the basis of the subscription information.

14. The method according to claim 11, further comprising storing a copy of the received feed in the network-side component.

15. The method according to claim 14, further comprising:
receiving a feed request from the mobile terminal in the network-side component;
if a copy of the requested feed is not available in the network-side component, forwarding the received feed request to the feed server, receiving the requested feed from the feed server, storing the received feed in the network-side component, and transmitting the received feed to the mobile terminal; and
if a copy of the requested feed is available in the network-side component, transmitting the stored copy to the mobile terminal.

16. The method according to claim 11, further comprising:
generating a content request on the basis of the received feed;
transmitting the content request to a content server;
receiving requested content from the content server in response to the content request; and
transmitting the received content to the mobile terminal.

17. The method according to claim 16, further comprising storing a copy of the received content in the network-side component.

18. The method according to claim 17, further comprising:
receiving a content request from the mobile terminal in the network-side component;
if a copy of the requested content is not available in the network-side component, forwarding the received content request to a content server, receiving the requested content from the content server, storing a copy of the received content in the network-side component, and transmitting the received content to the mobile terminal; and
if a copy of the requested content is available in the network-side component, transmitting the stored copy to the mobile terminal.

19. The method according to claim 16, further comprising selecting a communication link for transmitting the content to the mobile terminal from the group comprising at least a unicast communication link and a multicast communication link.

20. A computer program product comprising program code stored in computer readable medium, wherein the program code is configured for execution on a computer system and wherein the program code includes program instructions for instructing the computer system to implement a method of feed-based automatic transmission of content from a mobile network to a mobile terminal, said program instructions comprising program instructions to:
periodically generate a feed request in a network-side component on behalf of the mobile terminal, which is remote from the network-side component;
transmit the feed request to a feed server;
in response to the feed request, receive a requested feed from the feed server in the network-side component; and
selectively transmit the received feed from the network-side component to the mobile terminal.

21. An apparatus comprising a computer processor and a memory coupled to the computer processor, wherein the memory includes program code for configuring the apparatus to implement a method of feed-based automatic transmission of content from a mobile network to a mobile terminal, said program code comprising program instructions to:

periodically generate a feed request in a network-side component on behalf of the mobile terminal, which is remote from the network-side component;

transmit the feed request to a feed server;

in response to the feed request, receive a requested feed from the feed server in the network-side component; and selectively transmit the received feed from the network-side component to the mobile terminal.

* * * * *